United States Patent [19]

Bucher et al.

[11] Patent Number: 4,867,944

[45] Date of Patent: Sep. 19, 1989

[54] METHOD OF PREVENTING CORROSION BY CONTAMINATED COOLING TOWER WATERS

[75] Inventors: Bradley A. Bucher; Jesse H. Jefferies, both of Houston; Harold P. Templet, Orange, all of Tex.

[73] Assignee: Gulf Coast Performance Chemical, Inc., Houston, Tex.

[21] Appl. No.: 143,580

[22] Filed: Jan. 13, 1988

[51] Int. Cl.$^4$ ........................................... C23F 11/167
[52] U.S. Cl. ..................... 422/15; 210/697;
210/699; 210/701; 252/181; 252/389.23;
252/389.52; 252/389.54; 422/17; 422/18;
422/19
[58] Field of Search ............... 210/696, 697; 252/180,
252/181, 387, 389.2, 389.23, 389.52, 389.54;
422/15, 18, 19

[56] References Cited

U.S. PATENT DOCUMENTS

| | | | |
|---|---|---|---|
| 3,116,105 | 12/1963 | Kerst | 210/697 |
| 3,669,901 | 6/1972 | Murray | 252/387 |
| 3,928,211 | 12/1975 | Browning et al. | 252/387 |
| 4,017,315 | 7/1977 | Vurasovich et al. | 252/387 |
| 4,134,959 | 1/1979 | Menke et al. | 422/18 |
| 4,176,059 | 11/1979 | Suzuki | 210/697 |
| 4,209,398 | 6/1980 | Ii et al. | 422/17 |
| 4,217,216 | 8/1980 | Lipinski | 210/700 |
| 4,252,655 | 2/1981 | Carney | 252/389.52 |
| 4,797,713 | 2/1985 | Geiger | 210/698 |

FOREIGN PATENT DOCUMENTS 45-1328  1/1970  Japan .................................. 422/18

Primary Examiner—Peter Hruskoci
Attorney, Agent, or Firm—Browning, Bushman, Zamecki & Anderson

[57] ABSTRACT

A method of inhibiting corrosion in cooling tower systems comprising adding to a cooling tower water containing sulfides, hydrocarbons or mixtures thereof as contaminants a corrosion inhibiting composition containing a water-soluble zinc compound, a water-soluble molybdate, a water-soluble orthophosphate and a water-soluble polyphosphate.

7 Claims, 2 Drawing Sheets (UNTREATED)

METHOD OF PREVENTING CORROSION BY CONTAMINATED COOLING TOWER WATERS

BACKGROUND OF THE INVENTION

1. Field of the Invention

The present invention relates to preventing corrosion in cooling tower systems and, more specifically, to preventing corrosion or tuburculation of carbon steel and other corrosion prone materials subjected to contact with cooling tower water contaminated with hydrocarbons and/or sulfides.

2. Description of the Prior Art

Cooling towers are widely used in the refining and petrochemical industry to cool water used in heat exchangers, refrigeration units, etc. Commonly, the cooling tower systems employed in such environments are of the recirculating type, such that the water is used for cooling purposes and recycled to the cooling tower for chilling. It is common, particularly in refinery operations, for the cooling tower water to become contaminated with hydrocarbons, sulfides or both. These contaminants pose a special problem in controlling corrosion because of the fact that the hydrocarbons tend to form coatings on the corrosion prone materials inhibiting the action of the corrosion inhibitors and, at times, chemically reducing some of the active inhibitor components, while sulfides, which are generally severely corrosive in virtually any environment, can cause deposits leading to deep pitting or tuburculation.

Anti-corrosion compositions which employ various zinc compounds, molybdates, polyphosphates, etc. are well known. Examples of such compositions may be found, for example, in U.S. Pat. Nos. 4,217,216; 4,176,059; 4,017,315; DE No. 2,850,925 and Japan Kokai JP No. 52/38438 (77/38437). Additionally, an article entitled "Molybdate as a Pipeline Corrosion Inhibitor for Coal-Water Slurry Systems," *Phys. Metall. Res. Lab.*, 1986, discloses a composition comprised of molybdate, zinc sulfate and potassium phosphate as an erosion-corrosion inhibitor for steel used in coal-water slurries.

In addition to the above prior art, the composition disclosed herein has been used as a corrosion inhibitor in so-called clean water cooling tower systems, i.e. cooling tower systems wherein the water is generally free of contaminants, such as hydrocarbons and/or sulfides.

SUMMARY OF THE INVENTION

It is therefore an object of the present invention to provide a method for inhibiting corrosion in cooling tower systems.

Another object of the present invention is to provide a method for preventing corrosion in cooling tower systems wherein the water is contaminated with hydrocarbons and/or sulfides.

The above and other objects of the present invention will become apparent from the figures, the description given herein and the claims.

In the method of the present invention, a cooling tower water containing a contaminant, such as a sulfide, hydrocarbon or a mixture thereof, is treated with an effective amount of a corrosion inhibiting composition comprising from about 0.2 to about 4 parts per million of a water-soluble zinc compound, calculated as zinc, from about 1 to about 15 parts per million of a water-soluble molybdate, calculated as molybdate, from about 1 to about 15 parts per million of a water-soluble orthophosphate, calculated as orthophosphate, and from about 1 to about 15 parts per million of a water-soluble polyphosphate, calculated as orthophosphate.

DESCRIPTION OF THE PREFERRED EMBODIMENTS

Figure 1:
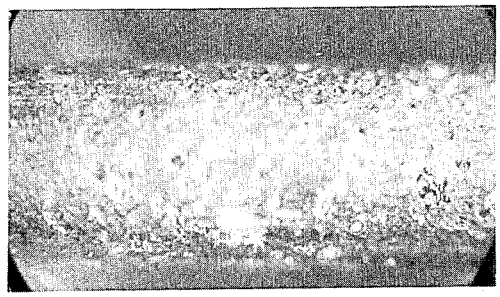
FIG. 1 is a photograph of a carbon steel test dowel which has been subjected to contaminated cooling tower water and in the absence of any corrosion inhibitor.

In the method of the present invention, the corrosion inhibiting composition, in an effective amount, is added to cooling tower water in the well known manner, the cooling water being circulated in the system. The cooling tower waters which can be treated according to the practice of the present invention are those which are contaminated, i.e. contain hydrocarbons, sulfide or other reducing components or mixtures thereof. Hydrocarbon contaminants include crude oil and various crude oil fractions, such as diesel fuel, naphthas, kerosene, gasoline cut hydrocarbons, etc. Sulfide contaminants include hydrogen sulfide and various other sulfur compounds, such as mercaptans, carbon disulfide, etc. which are known to be corrosive to mild or carbon steel. In typical refinery and some petrochemical operations, it is not uncommon for both sulfides and hydrocarbons to be present as contaminants in cooling tower water since hydrocarbons are a natural component of crude oil and sulfides of various types are present in many, sour crude oils.

The corrosion inhibiting composition used in the method of the present invention contains four basic components: (1) a water-soluble zinc compound, (2) a water-soluble molybdate, (3) a water-soluble orthophosphate and (4) a water-soluble polyphosphate.

Virtually any water soluble zinc compound, usually an inorganic zinc compound, can be employed in the composition of the present invention. Thus, compounds, such as zinc halides, e.g. zinc chloride, zinc sulfate, zinc nitrate, zinc nitrite, etc. can be employed. The zinc compound will be present in the composition in an amount such as to provide from about 0.2 to about 4 parts per million of zinc ion, the active component.

The molybdate compound can also be virtually any water-soluble molybdate, usually an inorganic molybdate. The alkali metal molybdates are preferred, sodium molybdate being especially preferred because of its relatively high solubility. The molybdate compound will be present in the compositions in an amount of from about 1 to about 15 parts per million calculated as molybdate ($MoO_4^{--}$), as the active component.

The water-soluble orthophosphates, which are generally the most highly hydrated form of phosphate, can include compounds such as monosodium phosphate, disodium phosphate, trisodium phosphate, phosphoric acid, etc. and will generally be present in an amount of from about 1 to about 15 parts per million calculated as orthophosphate, the active component. The orthophosphates are usually inorganic in nature.

The water-soluble polyphosphates which can be used are generally unhydrated or less hydrated than the orthophosphates, can include tetrapotassium pyrophosphate, sodium hexametaphosphate, sodium tripolyphosphate, tetrasodium pyrophosphate, etc. Usually, the polyphosphate will be inorganic in nature. The polyphosphate will generally be present in an amount of from about 1 to about 15 parts per million, calculated as orthophosphate, the active component. It will be appreciated that when placed in a water solution, most polyphosphates, at least partially, convert to the completely hydrated orthophosphates. Accordingly, it is contemplated in the present invention that it is only necessary to add a polyphosphate compound in an amount which will provide the required amount of orthophosphate as well as the required amount of polyphosphate specified above.

In carrying out the method of the present invention, the corrosion inhibiting composition will be introduced into the cooling tower water in an effective amount, i.e. an amount which takes into account the degree of contamination of the cooling tower water which can be determined by well known methods. Generally an amount of from about 50 to about 100 parts per million of the inhibitor composition, calculated as the total of the active components, is added.

In addition to the four basic components noted above, the corrosion inhibiting composition used in the method of the invention can also contain, with advantage, dispersants, such as polycarboxylic acids, both homopolymers and copolymers, organic phosphonates and other dispersants well known to those skilled in the art. When employed, the dispersants will be present in amounts ranging from about 1 to about 20 parts per million in the cooling tower water.

When copper components are present in the cooling tower system, it is also desirable to incorporate copper and copper alloy corrosion inhibitors, such as mercaptobenzothizole (MBT), benzitriazole (BZT), tolyltriazole (TTA), etc. When employed, such copper corrosion inhibitors will be present in an amount of from about 1 to about 20 parts per million of the cooling tower water.

If desired, the compositions can also contain microbiocides, anti-foulants and other such additives.

In carrying out the method of the present invention, the four basic components of the corrosion inhibiting composition can be added individually or in mixtures provided that it is generally necessary that the zinc compound and the polyphosphate compound be added separately.

To more fully illustrate the present invention, the following non-limiting examples are presented. All amounts in the examples and as set out above are by weight unless otherwise indicated.

EXAMPLE 1

A carbon steel test dowel having a smooth surface, free of tuburculation or other corrosion, was suspended in a glass vessel containing a typical refining cooling tower water having a pH of 7.0 to 8.5 and containing 250 mg/l of $Ca_2CO_3$, 200 mg/l $Cl^-$, 215 mg/l $SO_4^=$ and contaminated with 5 parts per million hydrogen sulfide and 50 parts per million of hydrocarbons. Temperature of the cooling tower water was maintained at 80°–120° F. and the dowel was rotated to achieve a surface velocity of 2 feet per second to simulate a cooling tower system of the open recirculation type. The dowel was left suspended in the cooling tower water for 17 hours. The photograph of FIG. 1 shows that severe tuburculation occurred to the dowel without any corrosion inhibiting composition present. Pitting (pits/cm$^2$) on a test piece left in the untreated water for hours was too numerous to count.

EXAMPLE 2

Figure 2:
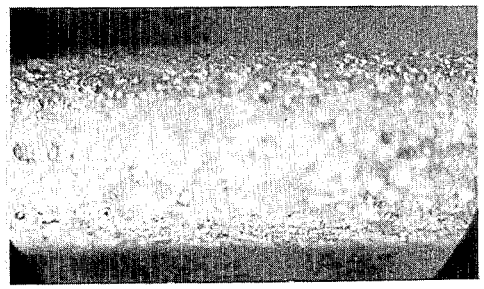
FIG. 2 is a photograph similar to FIG. 1 showing the effect of the addition of a prior art corrosion inhibitor.

The procedure of Example 1 was followed with the exception that the cooling tower water contained a chromate based corrosion inhibitor containing zinc chloride sufficient to provide 2 parts per million zinc ion, 20 parts per million chromate (sodium bichromate), 3 parts per million phosphonobutane tricarboxylic acid as a dispersant and 2 parts per million polymethacrylic acid as a dispersant. The photograph of FIG. 2 shows that relatively severe tuburculation occurred even in the presence of the chromate based corrosion inhibitor. Pitting on a test piece left in the chromate treated water for 24 hours mounted to 750 pits/cm$^2$.

EXAMPLE 3

Figure 3:
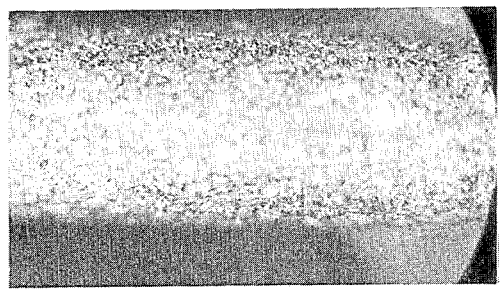
FIG. 3 is a photograph similar to FIG. 1 showing the effect of the addition of another prior art corrosion inhibitor.

The procedure of Example 1 was followed with the exception that a phosphate corrosion inhibitor was employed. The corrosion inhibitor contained 4 parts per million of polyphosphate (tetrasodium pyrophosphate) and 4 parts per million orthophosphate (disodium phosphate), the composition also containing 2 parts per million HEDP (hydroxyethane diphosphonic acid) and 10 parts per million hydroxypropylacrylate/acrylic acid copolymers as dispersants. The photograph of FIG. 3 shows that relatively severe tuburculation occurred to the dowel even in the presence of the phosphate-based corrosion inhibitor. Pitting on a test piece left in the phosphate treated water for 24 hours mounted to 350 pits/cm$^2$.

EXAMPLE 4

Figure 4:
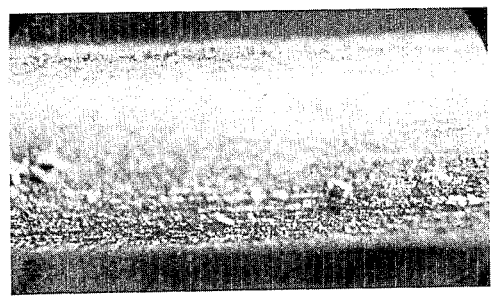
FIG. 4 is a photograph similar to FIG. 1 showing the effect of using the corrosion inhibiting method of the present invention.

The procedure of Example 1 was followed with the exception that the cooling tower water contained an anti-corrosion composition containing 4 parts per million molybdate (disodium molybdate dihydrate), 6 parts per million polyphosphate (tetrapotassium pyrophosphate), 4 parts per million orthophosphate (disodium phosphate) and 2 parts per million zinc (zinc chloride). The composition also included 10 parts per million of a mixed dispersant comprised of phosphonobutane tricarboxylic acid, acrylic acid/acrylamido-methyl propane sulfonic acid copolymer and polymaleic acid. The photograph of FIG. 4 shows that little tuburculation occurred on the dowel by using the method of the present invention. Additionally, pitting on a test piece left in the cooling water for 24 hours but treated according to the method of the present invention showed 40 pits/cm$^2$.

EXAMPLE 5

Figure 5:
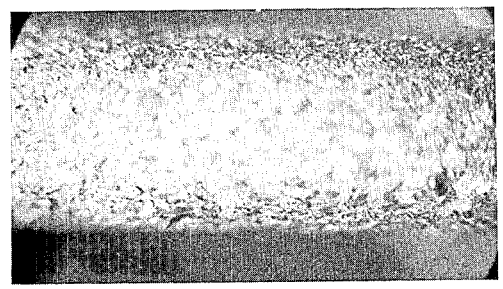
FIG. 5 is a photograph similar to FIG. 1 showing the effect of using a composition without any water-soluble molybdate present.

The procedure of Example 4 was followed with the exception that no molybdate was present in the corrosion inhibiting composition and only 4 parts per million of polyphosphate was employed The photograph of FIG. 5 shows that relatively severe tuburculation occurred. Additionally, pitting on a test piece left in the molybdatefree treated cooling water for 24 hours was too numerous to count.

EXAMPLE 6

Figure 6:
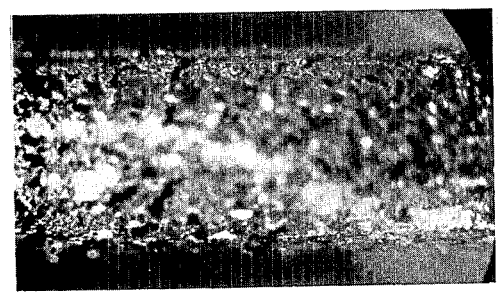
FIG. 6 is a photograph similar to FIG. 1 showing the effect of using a composition without any water-soluble zinc compound.

The procedure of Example 4 was followed with the exception that no water-soluble zinc compound was present in the corrosion inhibiting composition. Additionally, the composition contained only 2 parts per million polyphosphate and 2 parts per million molybdate. Only 7 parts per million of the mixed dispersant was used. The photograph of FIG. 6 shows that relatively severe tuburculation occurred Additionally, the pitting on a test piece which was left in the thus treated cooling tower water for 24 hours was too numerous to count.

As can be seen from the above examples, the method of the present invention provides excellent corrosion prevention in contaminated cooling waters, i.e. cooling waters containing sulfides and/or hydrocarbons. The method is applicable to any cooling tower water which is contaminated and can be used on various types of cooling tower systems, such as forced draft towers, induced draft towers, and hyperbolic towers. Tower flow may be counterflow or crossflow. The method is equally applicable to atmospheric cooling towers and natural draft towers, but finds particular application in open, recirculating cooling tower systems.

The foregoing disclosure and description of the invention is illustrative and explanatory thereof, and various changes in the method steps may be made within the scope of the appended claims without departing from the spirit of the invention.

What is claimed is:

1. A method of inhibiting corrosion of carbon steel in a cooling tower system comprising adding to a cooling tower water containing a contaminant selected from the group consisting of sulfides, hydrocarbons or mixtures thereof, an effective amount of a corrosion inhibiting composition comprising from about 0.2 to about 4 parts per million of a water-soluble zinc compound, calculated as zinc, from about 1 to about 15 parts per million of a water-soluble molybdate, calculated as molybdate, from about 1 to about 15 parts per million of a water-soluble orthophosphate, calculated as orthophosphate, and from about 1 to about 15 parts per million of a water-soluble polyphosphate, calculated as polyphosphate and from about 1 to about 20 parts per million of a dispersant, and circulating said water in said system.

2. The method of claim 1 wherein said corrosion inhibiting composition is added in an amount of from about 50 to 100 parts per million.

3. The method of claim 1 wherein said sulfide comprises hydrogen sulfide.

4. The method of claim 1 wherein said molybdate comprises an alkali metal molybdate.

5. The method of claim 1 wherein said corrosion inhibiting composition includes a copper corrosion inhibitor.

6. The method of claim 1 wherein said cooling tower system comprises an open recirculating cooling tower system.

7. The method of claim 1 wherein said contaminant comprises a mixture of sulfides and hydrocarbons.

* * * * *